Figure 1:
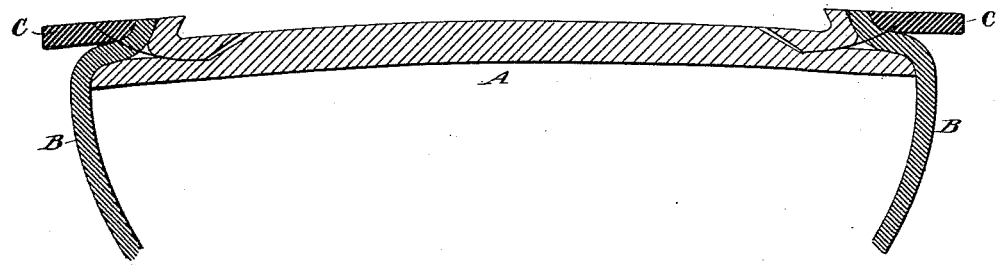

(No Model.)

S. H. HOWLAND.
METHOD OF FORMING SHOE BOTTOM FILLINGS.

No. 458,421. Patented Aug. 25, 1891.

Witnesses:
Charles R. Searle,
M. F. Boyle

Inventor:
Samuel H. Howland
By his attorney
Thomas Drew Stetson

UNITED STATES PATENT OFFICE.

SAMUEL H. HOWLAND, OF NEW YORK, N. Y.

METHOD OF FORMING SHOE-BOTTOM FILLINGS.

SPECIFICATION forming part of Letters Patent No. 458,421, dated August 25, 1891.

Application filed May 1, 1891. Serial No. 391,265. (No model.)

*To all whom it may concern:*

Be it known that I, SAMUEL H. HOWLAND, a citizen of the United States, residing in the city and county of New York, in the State of New York, have invented a certain new and useful Improvement in the Method of Forming the Bottoms of Shoes, of which the following is a specification.

It has been common heretofore to make fillings of felt, leather, or other material in sheet form and secure them by flour paste, which requires considerable skill and labor in skiving, especially at the edges, to give a properly evened and slightly-rounded contour to the surface. I have discovered that the work can be done more rapidly and perfectly by applying a material in a plastic state and allowing it to harden in place. I use a composition of leather and cement eminently adapted for this purpose. I can use waste leather, utilizing the fine cuttings from edge-trimming and heel-trimming machines, and if necessary grinding or otherwise evenly cutting or disintegrating the chips to supply a sufficient quantity for my purpose.

The following is a description of what I consider the best means of carrying out the invention: I take the cuttings, raspings, and finely-divided leather, in whatever condition, which is produced in other departments of the shoe-manufacture, taking care to avoid as far as possible any admixture of thread or other foreign material and to avoid the presence of any considerable lumps, and incorporate therewith rubber cement by a process analogous to kneading, using a sufficient quantity of the cement to make a mass sufficiently plastic to be easily spread and shaped. The composition may be prepared beforehand by the aid of machinery and kept in tightly-closed vessels ready to be removed by a trowel, spatula, or other convenient implement. The shoe when brought to a proper condition, presenting the usual hollowed irregular surface after the welt has been secured, is held on a jack or other convenient holder and a sufficient quantity of my filling material in the plastic state is applied in a central position and spread by the spatula or otherwise over the whole of the hollowed surface which requires to be filled. Now the shoe is left in this condition with the composition freely exposed to the air, and after the filling hardens by the evaporation of the naphtha from the cement, leaving the rubber holding the leather particles together, the shoe is ready to receive the outer sole and be finished in the ordinary manner. The application of the composition may, if preferred in any case, be made in excess and a portion subsequently removed by abrading after it is hardened. My experiments indicate that the soles filled with my composition are just sufficiently flexible and elastic. The material seems to be noiseless; but to reduce in the fullest degree the risk of creaking I dust the entire surface of the filling with soapstone before applying the outer sole. It will be observed that my filling is eminently light. The rubber remaining after the evaporation of the naphtha does not fill the interstices between the finely-divided pieces of leather, but leaves a great number of minute air-spaces.

The accompanying drawings form a part of this specification and represent what I consider the best means of carrying out the invention. They are cross-sections of the bottom portion of the shoe in different stages of the manufacture.

Figure 2:
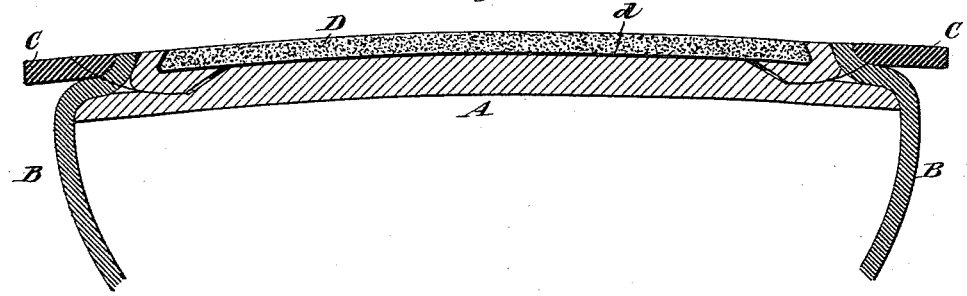
Figure 3:
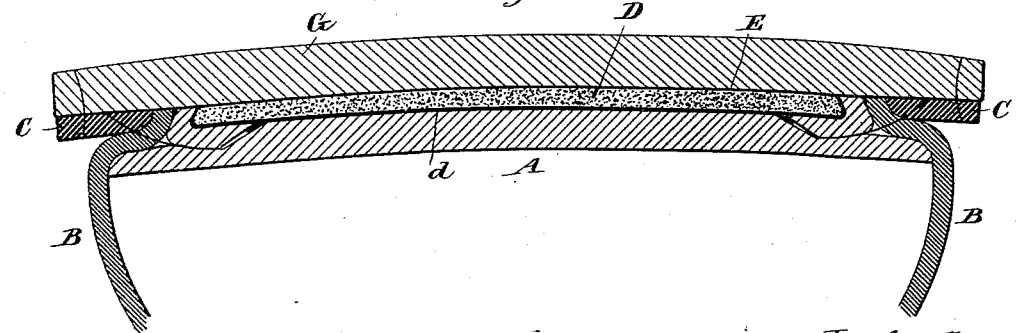

Figure 1 shows the shoe ready to receive the bottom-filling. Fig. 2 shows the same after my plastic bottom-filling has been applied and properly spread to fill the hollow and give the desired even and slightly-rounded surface. Fig. 3 shows the same after the outer sole has been applied. The stitches holding the substantial parts of the shoe-bottom together are not shown. They are of the ordinary character.

Similar letters of reference indicate like parts in all the figures.

A is the insole, curved and lipped in the ordinary manner.

B is the lower edge of the upper or vamp, and C the welt.

D is my plastic filling, and *d* a coating of cement applied in advance in a thin layer to the whole of the surfaces of the insole and lip which are to receive the filling. It will be understood that this coating of cement is applied also over the flat steel spring, (not shown,) which is secured in the base of the cavity in the shank to render this portion of the shoe properly firm and elastic.

E is the thin coating of powdered soapstone, which is applied over the whole face of my filling after the volatile portion of the cement has evaporated to reduce the liability of creaking.

G is the outer sole.

By reason of my filling being applied in the plastic condition it is easy to accommodate its form to all the inequalities of thickness and contour of the cavity to be filled.

My invention produces a fair and approximately smooth surface of exactly the right form with little labor and it requires but little skill.

Rubber cement is a well-known article of manufacture and trade. It is understood to be manufactured mainly from the cheaper qualities of African rubber with petroleum naphtha. Its constituents vary every moment by the evaporation of the naphtha by exposure to the air. Under ordinary conditions working rapidly in the open air, I think about five pounds of finely-cut leather will require ten pounds of rubber cement; but the proportions should be varied, so as to give a just sufficient consistence to allow the spreading of the composition. The success of the work is promoted by previously coating the surfaces thinly with rubber cement alone before the composition is applied; but this step can sometimes be omitted.

I claim as my invention—

In the manufacture of shoes, the method described of forming the bottoms, consisting in turning up a rim extending around at a proper distance within the edge of the bottom, sewing the welt in place outside of such rim, leaving a cavity within the rim requiring to be filled, placing in such cavity a plastic mass composed of scraps of leather and rubber cement intimately mixed in such proportions that the several scraps are coated with the cement, spreading such mass to fill the space within the rim, allowing it to harden in place with air-spaces between the several scraps, and subsequently securing the outer sole upon the bottom thus prepared, substantially as herein specified.

In testimony whereof I have hereunto set my hand, at New York city, New York, this 25th day of April, 1891, in the presence of two subscribing witnesses.

SAML. H. HOWLAND.

Witnesses:
CHARLES R. SEARLE,
M. F. BOYLE.